United States Patent
McLean

(10) Patent No.: US 10,635,638 B2
(45) Date of Patent: Apr. 28, 2020

(54) SYSTEMS, METHODS AND MEDIA FOR DEFERRED SYNCHRONIZATION OF FILES IN CLOUD STORAGE CLIENT DEVICE

(71) Applicant: Ivanti US LLC, South Jordan, UT (US)

(72) Inventor: Ian McLean, Lymm (GB)

(73) Assignee: Ivanti US LLC, South Jordan, UT (US)

( * ) Notice: Subject to any disclaimer, the term of this patent is extended or adjusted under 35 U.S.C. 154(b) by 171 days.

(21) Appl. No.: 13/801,158

(22) Filed: Mar. 13, 2013

(65) Prior Publication Data

US 2014/0279879 A1    Sep. 18, 2014

(51) Int. Cl.
 *G06F 16/17* (2019.01)
 *G06F 16/178* (2019.01)
 *G06F 16/182* (2019.01)

(52) U.S. Cl.
 CPC ........ *G06F 16/1734* (2019.01); *G06F 16/178* (2019.01); *G06F 16/1824* (2019.01)

(58) Field of Classification Search
 USPC ....................................................... 707/612
 See application file for complete search history.

(56) References Cited

U.S. PATENT DOCUMENTS

| | | | | |
|---|---|---|---|---|
| 5,402,428 A * | 3/1995 | Kakuta | ................ | G06F 3/0601 711/114 |
| 7,228,319 B1 | 6/2007 | Fuchs | | |
| 7,526,516 B1 | 4/2009 | Pavlyushchik | | |
| 2002/0052887 A1 | 5/2002 | Mori | | |
| 2004/0064488 A1* | 4/2004 | Sinha | ................ | G06F 11/1451 |
| 2004/0133544 A1* | 7/2004 | Kiessig et al. | .................... | 707/1 |
| 2006/0106893 A1* | 5/2006 | Daniels et al. | ............... | 707/204 |
| 2006/0242204 A1 | 10/2006 | Karas et al. | | |
| 2008/0263107 A1 | 10/2008 | Sohn et al. | | |
| 2009/0164606 A1* | 6/2009 | Epifania et al. | ............... | 709/219 |
| 2011/0218964 A1 | 9/2011 | Hagan et al. | | |

(Continued)

FOREIGN PATENT DOCUMENTS

| | | |
|---|---|---|
| EP | 1681652 A2 | 7/2006 |
| GB | 2384589 A | 7/2003 |

OTHER PUBLICATIONS

"Dropbox—Why aren't certain files on one computer syncing to another?", https://www.dropbox.com/help/145/en, printed on May 13, 2013, 3 pages.

(Continued)

*Primary Examiner* — Mohsen Almani

(57) ABSTRACT

Systems, methods and media are provided for deferred synchronization of files in cloud storage systems. One method includes detecting changes to a data file. The method also includes monitoring I/O operations performed by a process associated with the changes. When the process is busy, the method also includes adding to an upload file list a name of a first file in response to a creation/modification of the first file. The method further includes adding to the list a new name of a second file and, when applicable, removing from the list an old name of the second file in response to renaming the second file. The method also includes removing from the list a name of a third file in response to a deletion of the third file and uploading files identifiable using file names in the list to the cloud storage server when the process is no longer busy.

20 Claims, 5 Drawing Sheets

(56) References Cited

U.S. PATENT DOCUMENTS

2013/0185258 A1* 7/2013 Bestler ............... G06F 16/1824
707/638
2013/0238552 A1 9/2013 Saib

OTHER PUBLICATIONS

Search Report for UK Application No. GB 1303927.6, dated Sep. 23, 2013, 3 pages.
Office Action for U.S. Appl. No. 13/418,090, dated Jul. 24, 2014, 8 pages.
Thurrott, P., "SkyDrive: Now with Selective Sync and Shared Content," [Online], Nov. 15, 2012, ITPro Today, Retrieved from the Internet: <URL: http://www.itprotoday.com/print/skydrive/skydrive-now-selective-sync-and-shared-content>, 5 pages.

* cited by examiner

SYSTEMS, METHODS AND MEDIA FOR DEFERRED SYNCHRONIZATION OF FILES IN CLOUD STORAGE CLIENT DEVICE

TECHNICAL FIELD

Disclosed systems, methods and media relate to deferred synchronization of one or more files in a cloud storage client device. Specifically, disclosed systems, methods and media relate to deferred uploading of new and modified files, which are related to making changes to a data file, from a cloud storage client device to a cloud storage server until a process associated with making the changes finishes saving the changes to the data file.

BACKGROUND

Cloud storage systems often use software programs running on cloud storage client devices to upload and download files to/from a cloud storage server. Some cloud storage client devices use a driver to detect changes to files and upload them as soon as the files are closed by application(s). However, this approach can lead to spurious uploading of temporary files that are routinely created by many application programs (e.g., Microsoft™ Word™) as parts of a transactional approach to making and saving changes to files. When network bandwidth between a client device and a server is limited, such spurious uploading can have a detrimental effect on the performance of the cloud storage client device, the cloud storage server and other applications sharing the same network connection.

Conventional approaches for addressing this problem include an attempt to identify temporary files by virtue of their names or file system attributes that can explicitly identify the files as being temporary. However, it is not always the case that temporary files are easily identifiable. Therefore, the identification approach carries a risk of misidentification. The identification approach also carries additional risks in a cross-platform use where a naming convention and other underlying platform-dependent conventions that are used to identify a temporary file may be different and/or may be subject to changes.

SUMMARY

In accordance with the disclosed subject matter, systems, methods and media are provided for deferred synchronization of one or more files in a cloud storage client device. Specifically, disclosed systems, methods and media provide for deferred synchronization of one or more files between a cloud storage client device and a cloud storage server. For example, the disclosed subject matter includes a method that includes detecting a change to a data file stored in a cloud storage directory in a cloud storage client device. The cloud storage directory is managed by a cloud storage service program. The method also includes monitoring input-output (I/O) operations performed by a process associated with making the change to the data file. When it is determined that the process is busy with the I/O operations, the method further includes adding to an upload file list a name of a first file in response to a creation or a modification of the first file by the process in connection with making the change to the data file. The upload file list is configured to include one or more names of files that need to be uploaded to a cloud storage server for synchronization. The method also includes adding to the upload file list a new name of a second file and, when the upload file list includes an old name of the second file, removing from the upload file list the old name of the second file in response to renaming the second file in connection with making the change to the data file. The method also includes removing from the upload file list a name of a third file in response to a deletion of the third file in connection with making the change to the data file and uploading to the cloud storage server one or more files identified using file names that remain in the upload file list when the process is no longer busy with the I/O operations.

In some embodiments, the cloud storage service program includes a background process. In some embodiments, the data file includes at least one of a document file, an image file, an executable file, a graphics file, an animation file, an object file, a database file and a text file. In some embodiments, the process includes a running instance of an application program. In some embodiments, the first file includes a first temporary file that is created to copy original content of the data file and save the change to the data file. In some embodiments, the second file includes the data file and the first temporary file containing the change to the data file. In some embodiments, the data file is renamed to a second temporary file name and the first temporary file is renamed using the name of the data file.

In some embodiments, the data file is renamed before the first temporary file is renamed. In some embodiments, the third file includes the second temporary file that is deleted after the first temporary file containing the change to the data file is renamed. In some embodiments, the process is no longer busy with the I/O operations after the second temporary file is deleted. In some embodiments, the upload file list includes at least one of a queue, a linked list and a text file.

The disclosed subject matter also includes an apparatus that includes one or more interfaces configured to provide communication with one or more nodes over a network and a processor in communication with the one or more interfaces. The processor is configured to run a cloud storage management module that is configured to detect a change to a data file stored in a cloud storage directory in the apparatus. The cloud storage directory is managed by a cloud storage service program. The cloud storage management module is also configured to monitor input-output (I/O) operations performed by a process associated with making the change to the data file. When it is determined that the process is busy with the I/O operations, the cloud storage management module is further configured to add to an upload file list a name of a first file in response to a creation of a modification of the first file by the process in connection with making the change to the data file. The upload file list is configured to include one or more names of files that need to be uploaded to a cloud storage server for synchronization. The cloud storage management module is also configured to add to the upload file list a new name of a second file and, when the upload file list includes an old name of the second file, remove from the upload file list the old name of the second file in response to renaming the second file in connection with making the change to the data file. The cloud storage management module is further configured to remove from the upload file list a name of a third file in response to a deletion of the third file in connection with making the change to the data file and upload to the cloud storage server one or more files identified using file names that remain in the upload file list when the process is no longer busy with the I/O operations.

The disclosed subject matter further includes a non-transitory computer readable medium having executable instructions operable to cause an apparatus to detect a change to a data file stored in a cloud storage directory in the apparatus. The cloud storage directory is managed by a cloud storage service program. The executable instructions are also operable to cause the apparatus to monitor input-output (I/O) operations performed by a process associated with making the change to the data file. When it is determined that the process is busy with the I/O operations, the executable instructions are further operable to cause the apparatus to add to an upload file list a name of a first file in response to a creation or a modification of the first file by the process in connection with making the change to the data file. The upload file list is configured to include one or more names of files that need to be uploaded to a cloud storage server for synchronization. The executable instructions are also operable to cause the apparatus to add to the upload file list a new name of a second file and, when the upload file list includes an old name of the second file, remove from the upload file list the old name of the second file in response to renaming the second file in connection with making the change to the data file. The executable instructions are also operable to cause the apparatus to remove from the upload file list a name of a third file in response to a deletion of the third file in connection with making the change to the data file and upload to the cloud storage server one or more files identified using file names that remain in the upload file list when the process is no longer busy with the I/O operations.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be had to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
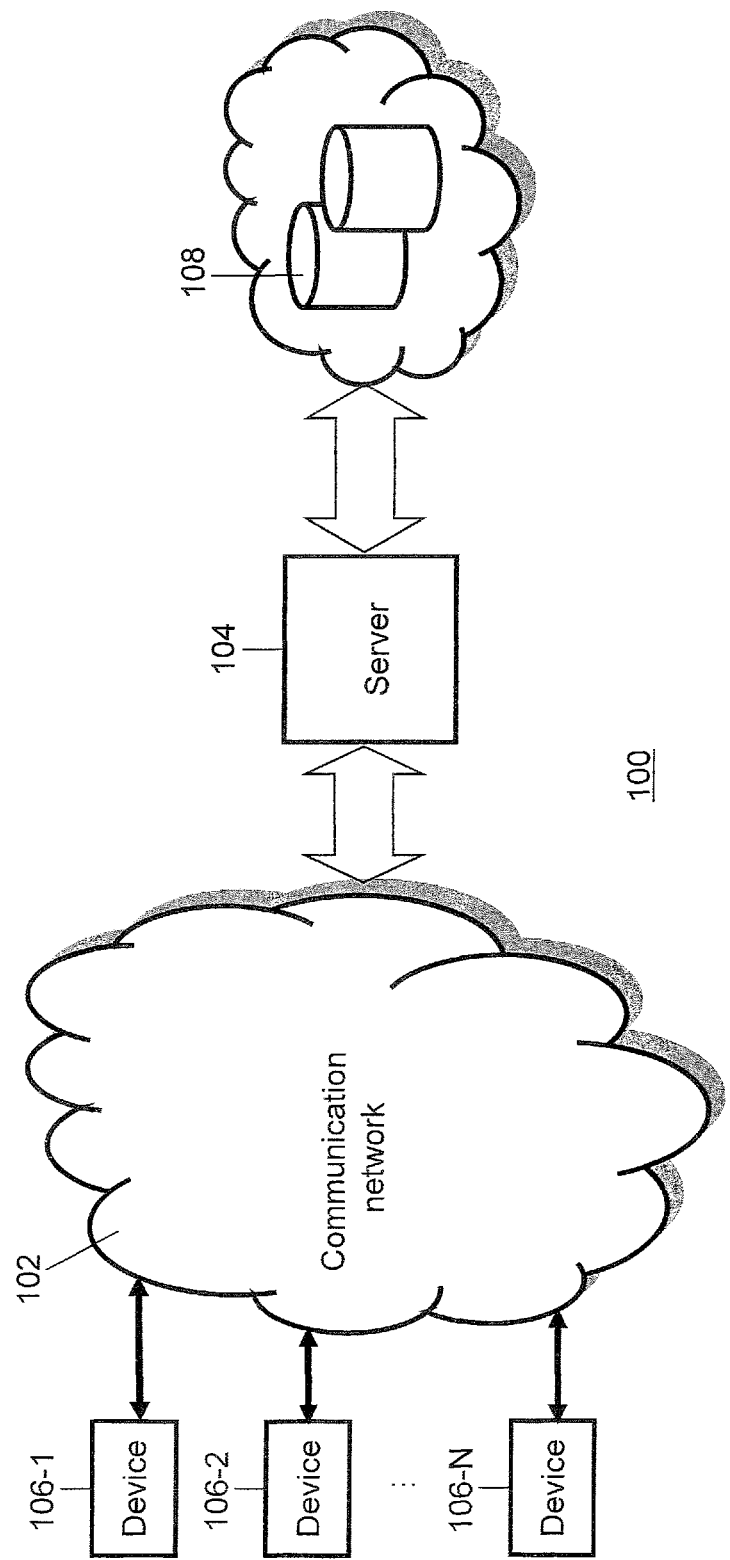
FIG. 1 illustrates a diagram of a networked communication system in accordance with an embodiment of the disclosed subject matter.

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

The disclosed systems, methods and media are provided for deferred uploading of new and modified files, which are related to making changes to a data file, from a cloud storage client device to a cloud storage server until a process associated with making the changes finishes saving the changes to the data file. In one embodiment, for example, a tablet computer (a cloud storage client device) user modifies a word processing document file, named "myJournal," that is stored in a cloud storage directory in the tablet computer. The document file includes a daily journal related to a social study research the user has been conducting for the past few months. The user has been updating and saving the document file in the tablet computer and uploading it to a cloud storage server. After adding a few paragraphs about a new set of data that she gathered, the user selects the "Save" option in the menu to save the changes the user made to the document file. A cloud storage management daemon, which runs on the tablet computer and manages the cloud storage directory, detects that changes are made to the document file and begins monitoring the input/output (I/O) operations that are performed by an instance (i.e., process) of the word processing program.

When the "Save" option is selected, the word processing process writes the content of the updated document file to a temporary file ("TMP 1"). When the temporary file (TMP 1) is created to copy the updated content of the document file, the cloud storage daemon detects it and determines whether the word processing process is busy with I/O operations.

When the daemon determines that the process is busy with I/O operations (e.g., the number of I/O operations is non-zero) associated with saving the document file, it adds the name of the temporary file (TMP 1) to an upload file list instead of uploading the temporary file to a cloud storage server for synchronization (i.e., synchronization is deferred).

The word processing process next renames the document file containing the original content to "TMP 2." When the document file is renamed, the cloud storage daemon detects it and determines whether the word processing process is still busy with I/O operations. When the daemon determines that the process is still busy saving the document file, it adds the new file name TMP 2 to the upload file list instead of uploading the new temporary file, TMP 2, (i.e., the document file with a new name) to the cloud storage server for synchronization.

The word processing process next renames the temporary file (TMP 1) to "myJournal" to save the updated content of the document file under the original document file name. When the temporary file is renamed, the cloud storage daemon detects it and determines whether the word processing process is still busy with I/O operations. When the daemon determines that the process is still busy saving the document file, the daemon adds the new file name "myJournal" to the upload file list instead of uploading the updated document file ("myJournal") to the cloud storage server for synchronization. The daemon also removes the old file name "TMP 1" from the upload file list.

The word processing process next deletes the TMP 2 (i.e., the document file with original content that was renamed to TMP 2 earlier). When TMP 2 file is deleted, the cloud storage daemon detects it and determines whether the word processing process is still busy with I/O operations. When the daemon determines that the process is still busy saving the document file, it removes the file name TMP 2 from the upload file list.

When the word processing process finishes saving the document file with the updated content, the cloud storage daemon determines that the process is no longer busy with I/O operations and starts uploading file(s) that are identified by the file names included in the upload file list—in this case, just the document file "myJournal" and none of the temporary files (i.e., TMP 1 and TMP 2)—to complete a deferred synchronization.

The user is notified that the document file is saved in her tablet computer and successfully uploaded to the cloud storage server. The user is able to modify the document file, save the changes she made and upload the updated document file to the cloud storage server without spurious uploads of the temporary files used during the saving of the document file because the actual uploading of file(s) can be deferred until the changes to the document file is saved first.

FIG. 1 illustrates a diagram of a networked communication arrangement 100 in accordance with an embodiment of the disclosed subject matter. The networked communication arrangement 100 can include a communication network 102, a cloud storage server 104, at least one cloud storage client device 106 (e.g., cloud storage client devices 106-1, 106-2, . . . 106-N), and a database 108.

Each cloud storage client device 106 can send data to, and receive data from, the cloud storage server 104 over the communication network 102. In some embodiments, a cloud storage client device 106 may be any computing device that runs a cloud storage application program. Each cloud storage client device 106 can be directly coupled to the cloud storage server 104; alternatively, each cloud storage client device 106 can be connected to the cloud storage server 104 via any other suitable device(s), communication network(s), or combination thereof. For example, each cloud storage client device 106 can be coupled to the cloud storage server 104 via one or more routers, switches, access points, and/or communication networks (as described below in connection with communication network 102). A cloud storage client device 106 can include a desktop computer, a mobile computer, a tablet computer, a cellular device, a smartphone or any computing system that is capable of performing computation. The cloud storage server 104 can be a single server, or a network of servers, or a farm of servers in a data center.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the network 102 as a single network; however, the network 102 can include multiple interconnected networks listed above.

The cloud storage server 104 can be coupled to a database system. The database 108 can include at least one of two types of databases: a local database and a remotely located database. The database 108 can include any data supported by one or more data structures; alternatively, it could include one or more database management system (DBMS) or a distributed database. The database 108 can also include at least one of a relational database, object database (a.k.a., object-oriented database), XML database, cloud database, active database, and a data warehouse. In some embodiments, the database 108 may be a file server or other types of file storage. The database 108 may include at least one physical, non-transitory storage medium.

In some embodiments, the database 108 can be provided as an enterprise system in a corporate environment For example, the communication network 102, the cloud storage server 104, the cloud storage client devices 106, and the database 108 can be located in close proximity and can be a part of a single company. In some cases, the cloud storage server 104, the cloud storage client devices 106, and the database 108 can be located in the same building and can be coupled to one another via a local communication network. The local communication network can include a local area network (LAN), a corporate network, and a virtual private network (VPN) associated with the corporate network. FIG. 1 shows the database 108 as separate from the communication network 102. However, the database 108 can be part of communication network 102 or another communication network.

Figure 2:
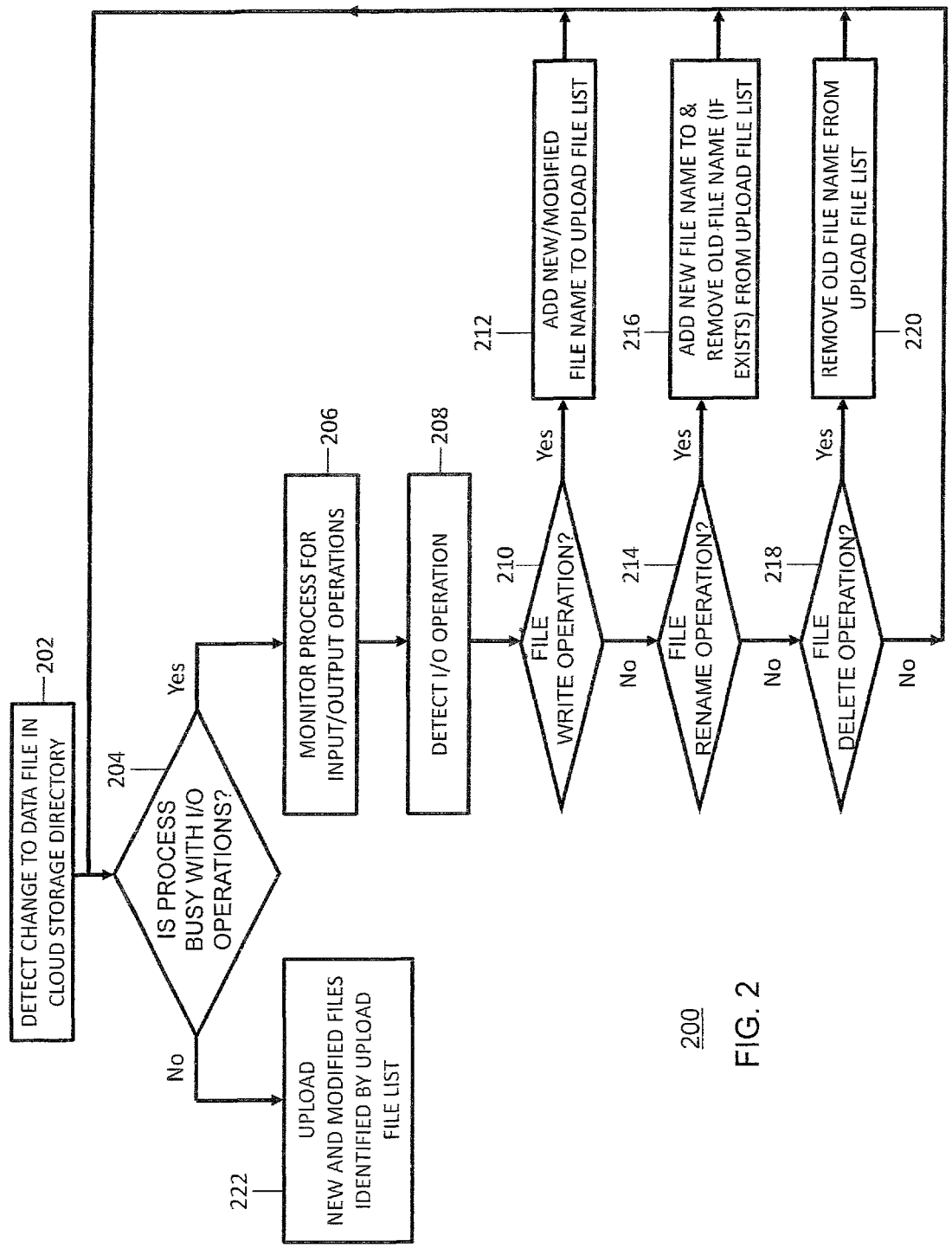
FIG. 2 is a flow diagram for deferred synchronization of files in cloud storage client device in accordance with an embodiment of the disclosed subject matter.

FIG. 2 is a flow diagram 200 for deferred synchronization of files in a cloud storage client device in accordance with an embodiment of the disclosed subject matter. At 202, a change to a data file stored in a cloud storage directory is detected. In some embodiments, a cloud storage management service program (e.g., a cloud storage daemon) is configured to monitor one or more files in the cloud storage directory and to detect when changes are made to a file. In some embodiments, the cloud storage management service program is a background process, or a daemon, that runs in the background of a cloud storage client device for monitoring files in the cloud storage directory and for detecting when changes are made to one or more of the files. When, for example, a user opens a spreadsheet document ("myExpense") stored in the cloud storage directory of her computer, updates the spreadsheet document and saves the changes she made, a cloud storage daemon running in the background of the user computer can detect that the spreadsheet document is modified.

At 204, the cloud storage management service program determines whether a process that is associated with making the change to the data file is busy with input-output (I/O) operations related to saving the change to the data file. If it is determined at 204 that the process is busy, the service program monitors the process for I/O operations at 206. For example, the cloud storage daemon can determine whether an instance, or a running process, of the spreadsheet application is busy handling I/O operations related to saving the changes made to the spreadsheet document. In some embodiments, a load-measuring heuristic, which continuously counts the number of I/O operations per a time interval using an equation (1), shown below, may be used to determine whether the process is busy executing I/O operations.

$$L_t = F_t + H^* L_{t-1} \quad (1),$$

where $L_t$ is the I/O load at time t, $F_t$ is the total number of I/O operations at time t, and H is a feedback multiplier. In some embodiments, the I/O operations include a set of executable instructions related to one or more input/output functions.

At 208, the cloud storage management service program detects one or more I/O operations, or file operation(s), related to saving the change made to the data file. For example, the cloud storage daemon can detect file operation(s) involving a creation, renaming or a deletion of a file. In some embodiments, only the I/O operations that would cause uploading of one or more files for synchronization with a cloud storage server are detected.

At 210, the cloud storage management service program determines whether the detected file operation is a write, or write-to-file, operation. If it is determined at 210 that the detected file operation is a write-to-file operation, the service program adds at 212 the name of a file that is created or modified. When, for example, the user selects a "Save" option from the spreadsheet application menu to save the changes she made, the spreadsheet process can create a temporary file, named "Tmp-Update," and copy the updated content of the spreadsheet file including the changes made by the user to the temporary file ("Tmp-Update"). The cloud storage daemon detects it and, instead of uploading the temporary file to the cloud storage server for immediate synchronization, adds the name of the temporary file to an upload file list that is configured to include one or more files that need to be uploaded for deferred synchronization. The service program then returns to 204.

If, however, it is determined at 210 that the detected file operation is not a write-to-file operation, the cloud storage management service program determines at 214 whether the detected file operation is a rename-file operation. If it is determined at 214 that the detected file operation is a rename-file operation, the service program at 216 adds a new name of the data file to the upload file list and, if the upload file list includes an old name of the data file, removes the old name of the data file from the upload file list. After copying the updated content of the spreadsheet file, for example, the spreadsheet process can rename the data file containing the original content to a second temporary file name. The cloud storage daemon detects it and, instead of uploading the second temporary file, adds the second temporary file name to the upload file list for deferred synchronization. Because the upload file list does not include the secondary temporary file name, no file name is removed from the list. The spreadsheet process can also rename the first temporary file containing the updated content of the spreadsheet file to the original name of the data file, "myExpense." The cloud storage daemon detects it and, instead of uploading the renamed data file to the cloud storage server, adds the renamed data file ("myExpense") to the upload file list and removes the old file name, "Tmp-Update." The service program then returns to 204.

If it is determined at 214 that the detected file operation is not a rename-file operation, the cloud storage management service program determines at 218 whether the detected file operation is a delete-file operation. If it is determined at 218 that the detected file operation is a delete-file operation, the service program at 220 removes the name of the deleted file from the upload file list and return to 204. For example, once the first temporary file, including the updated content of the spreadsheet document is renamed to the original name of the spreadsheet document ("myExpense"), the spreadsheet process can delete the second temporary file including the original content of the spreadsheet file. The cloud storage daemon detects the deletion and removes the second temporary file name from the upload file list.

If, however, it is determined at 218 that the detected file operation is not a delete-file operation, the detected file operation may not be a file operation, or an operation that is related to uploading, or synchronization, of the data file. The service program returns to 204. If it is determined at 204 that the spreadsheet process is no longer busy with the I/O operations, the cloud storage management service program can upload at 222 the file(s), which can be identified using the upload file list, to the cloud storage server. For example, the cloud storage daemon can begin uploading the file(s) in the upload file list—in this example, the spreadsheet document, "myExpense"—to the cloud storage server. Once the deferred synchronization is complete (i.e., "myExpense" document is uploaded to the cloud storage server), the upload file list can be cleared, e.g., by removing all of the file names still remaining in the list. For example, the name of "myExpense" document will be deleted from the upload file list once the document is properly uploaded. Though the flow diagram 200 describes operations at 210, 214 and 218 serially, the operations can take place in any suitable order, in parallel, or any combination thereof. In addition, the I/O operations can include additional operations, fewer operations, or any suitable combination thereof.

Figure 3:
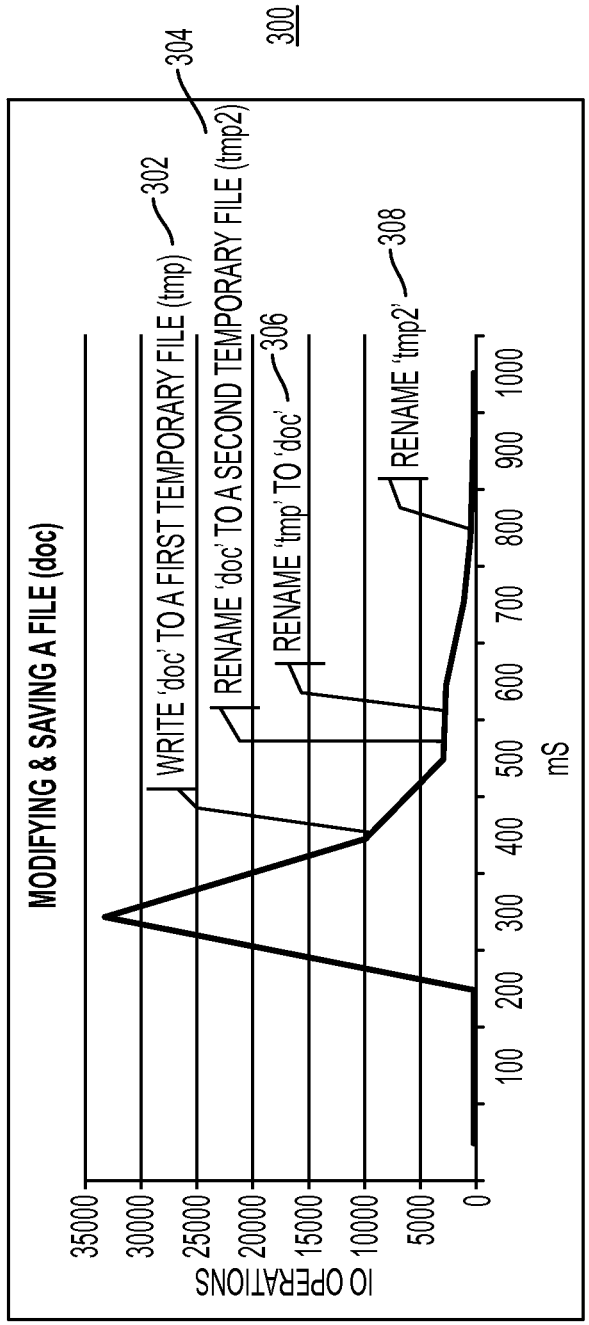
FIG. 3 is a diagram illustrating input-output (I/O) load changes during a file save operation in accordance with an embodiment of the disclosed subject matter.
Figure 4:
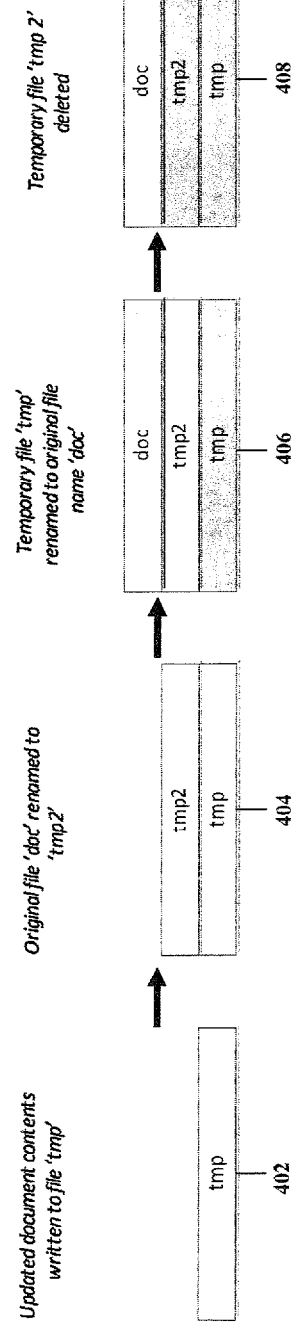
FIG. 4 is a block diagram illustrating an upload file list during a file save operation in accordance with an embodiment of the disclosed subject matter.

FIG. 3 is a diagram 300 illustrating input-output (I/O) load changes during a file save operation in accordance with an embodiment of the disclosed subject matter. FIG. 4 is a block diagram 400 illustrating an upload file list during a file save operation in accordance with an embodiment of the disclosed subject matter. FIGS. 3 and 4 will be referred together in explaining I/O load changes and changes to the content of a corresponding upload file list. When a file save operation is requested at 302 after changes are made to a data file (doc), a document process associated with making the changes to the data file creates a first temporary file (tmp) to write the updated content of the data file. The document process is busy with input/output (I/O) operations at 302 (e.g., the number of I/O operations executed by the process is non-zero—about 10,000 I/O operations) and thus a cloud storage daemon adds, as shown in 402, the name of the first temporary file (tmp) to an upload file list instead of uploading the first temporary file to a cloud storage server.

At 304, the document process renames the data file (doc) to a second temporary file name (tmp2). The document process is still busy with I/O operations at 304 (e.g., the number of I/O operations is still non-zero) and thus the cloud storage daemon adds, as shown in 404, the name of the new file—second temporary file (tmp2)—to the upload file list instead of uploading the second temporary file to the cloud storage server. Because the upload file list does not include the name of the data file (doc), it is not necessary (or possible) to remove the old name of the renamed data file (doc) from the upload file list.

At 306, the document process renames the first temporary file to the name of the data file (doc). The document process is still busy with I/O operations at 306 and the cloud storage daemon, as shown in 406, adds a new name of the file—the data file (doc)—instead of uploading the data file (doc) to the cloud storage server. The daemon also removes the old name of the file (tmp) from the upload file list, as shown in 406 (the file name 'tmp' is grayed to indicate that it is removed from the list).

At 308, the document process deletes the second temporary file. The document process is still handling a number of I/O operations (non-zero I/O operations) at 308 and the cloud storage daemon removes, as shown in 408, the name of the second temporary file (tmp2) from the upload file list. The document process finishes saving the changes made to the data file after deleting the second temporary file and is no longer busy executing I/O operations (the number of I/O operations reaches zero). The cloud storage daemon detects it and starts uploading the file(s), which can be identified from the upload file list, to the cloud storage server for deferred synchronization.

Figure 5:
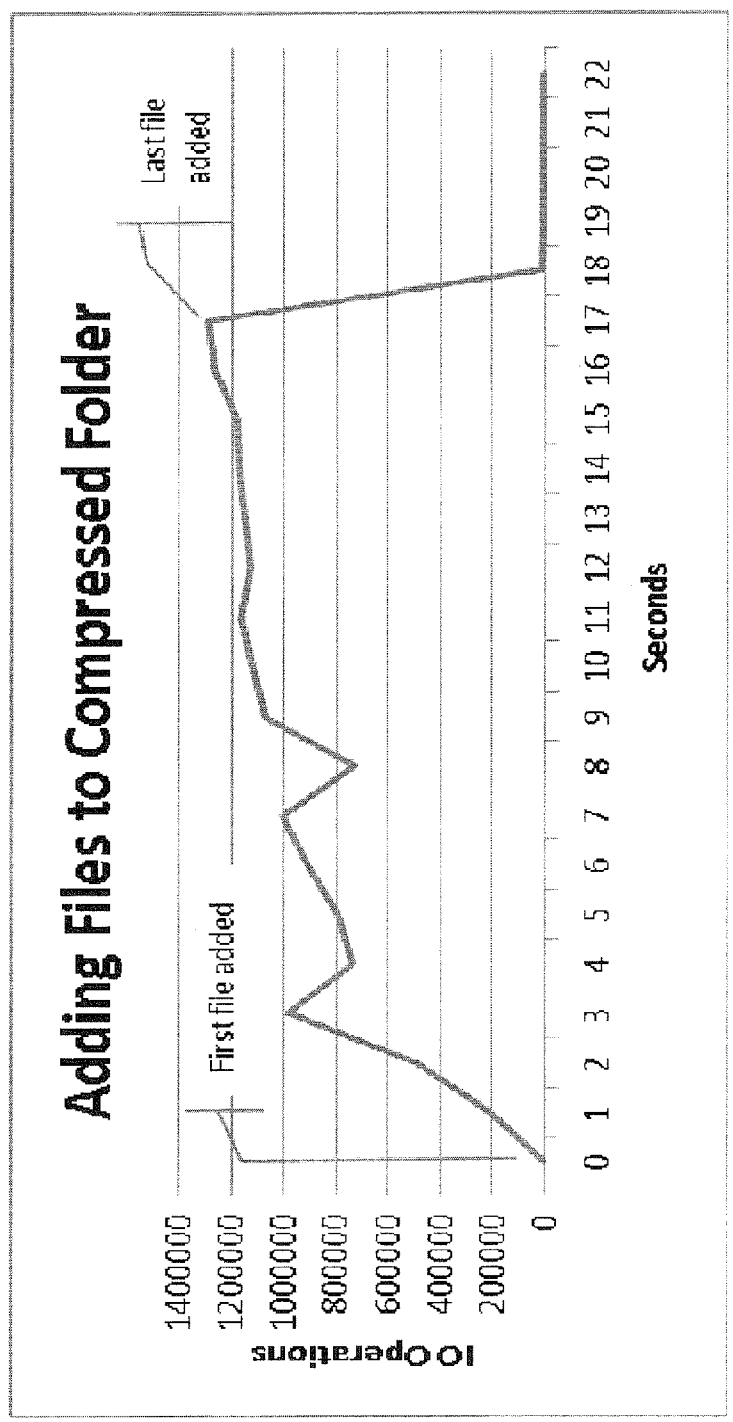
FIG. 5 is a diagram illustrating IO load changes during a zip file update in accordance with an embodiment of the disclosed subject matter.

FIG. 5 is a diagram illustrating IO load changes during a zip file update in accordance with an embodiment of the disclosed subject matter. As individual files are added to and/or removed from a zip file, a process associated with updating the zip file becomes busy handling I/O operations related to the zip file update, creating and deleting temporary files, over a continuous time interval. In some embodiments, uploading of one or more files in an upload file list may be forced if the files stay in the list pending uploading over a predetermined amount of time (specified maximum age) to balance the competing interests of uploading optimization and preservation of coherency with the cloud storage server.

Figure 6:
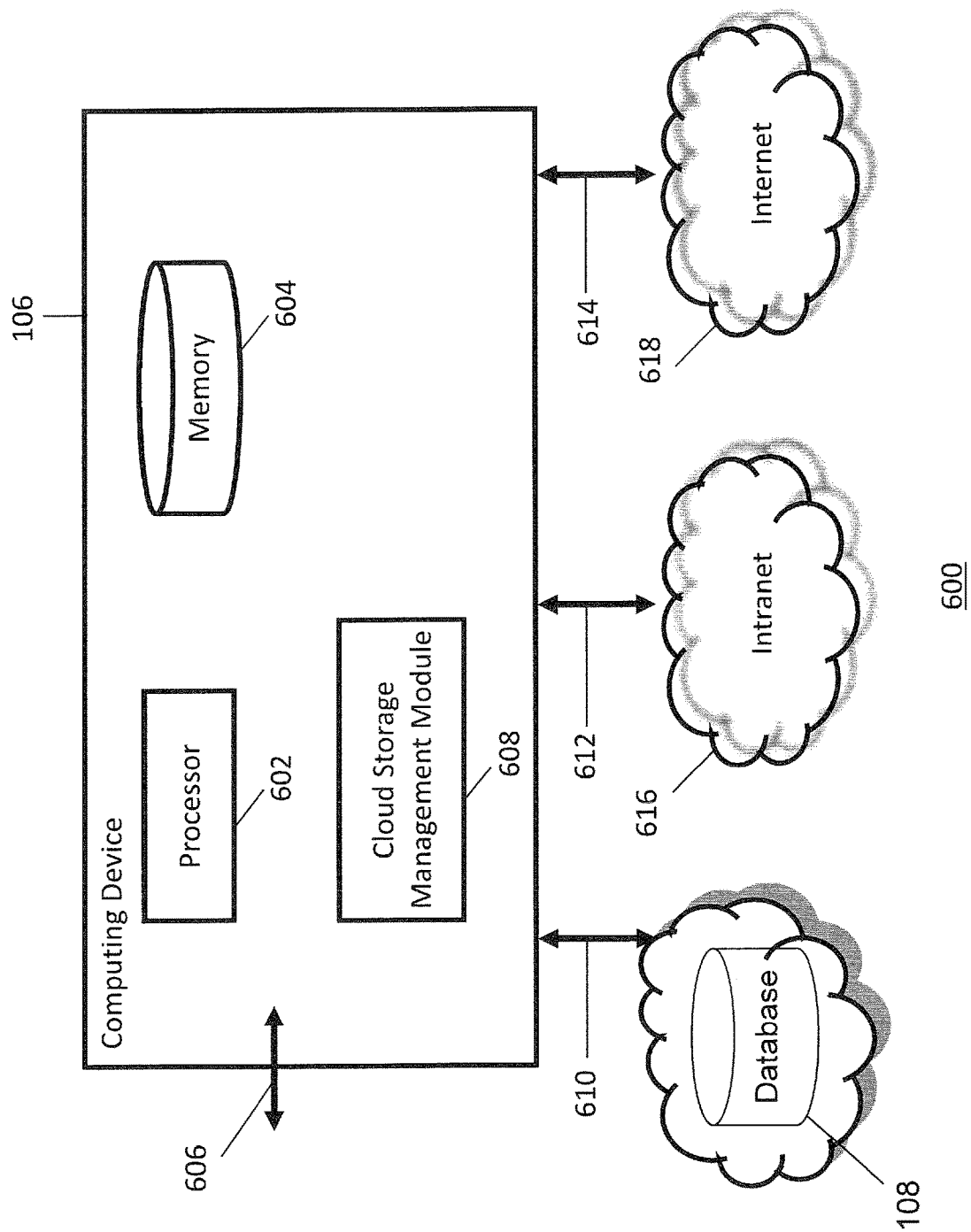
FIG. 6 is a block diagram of a cloud storage client device in accordance with an embodiment of the disclosed subject matter.

FIG. 6 is a block diagram 600 of the cloud storage client device 106 in accordance with certain embodiments of the disclosed subject matter. The block diagram 600 shows a cloud storage client device 106, which includes a processor 602, a memory 604, interfaces 606, 610, 612, and 614, a cloud storage management module 608, a database 108, an Intranet 616, and the Internet 618. The memory 604 and the interfaces 606, 610, 612, and 614 are communicatively coupled to the processor 602. The cloud storage client device 106 can communicate with the cloud storage server 104 (not shown) via the interface 606; the cloud storage client device 106 can communicate with the database 108 via the interface 610; the cloud storage client device 106 can communicate with the Intranet 616 via the interface 612; and the cloud storage client device 106 can communicate with the Internet 618 via the interface 614. The interfaces 606, 610, 612, and 614 are shown as separate interfaces but may be the same physical interface. The processor 602 can run software programs and modules, including the cloud storage management module 608. The memory 604 is capable of storing data that can be used by the processor 602 to run the software programs and modules, including the cloud storage management module 608.

The cloud storage management module 608 can be configured to communicate, or interact, with cloud storage server 104 through the interface 606 for (deferred) synchronization of files. The cloud storage management module 608 can be also configured to detect a change to a data file stored in a cloud storage directory in a cloud storage client device 106. The cloud storage management module 608 manages the cloud storage directory. The cloud storage management module 608 can be further configured to monitor input-output (I/O) operations performed by a process associated with making the change to the data file.

When it is determined that the process is busy with the I/O operations, the cloud storage management module 608 can be also configured to add to an upload file list a name of a first file in response to a creation of the first file by the process in connection with making the change to the data file. The upload file list is configured to include one or more names of files that need to be uploaded to a cloud storage server for synchronization. The cloud storage management module 608 can be also configured to add to the upload file list a new name of a second file and, when the upload file list includes an old name of the second file, remove from the upload file list the old name of the second file in response to renaming the second file in connection with making the change to the data file.

The cloud storage management module 608 can be further configured to remove from the upload file list a name of a third file in response to a deletion of the third file in connection with making the change to the data file and upload to the cloud storage server one or more files identified using file names that remain in the upload file list when the process is no longer busy with the I/O operations.

FIG. 6 shows a cloud storage client device 106 having the cloud storage management module 608 that performs the above-described operations in accordance with certain embodiments of the disclosed subject matter. The cloud storage client device 106 may include additional modules, less modules, or any other suitable combination of modules that perform any suitable operation or combination of operations.

The interfaces 606, 610, 612, and 614 provide an input and/or output mechanism to communicate over a network. The interfaces 606, 610, 612, and 614 enable communication with the cloud storage client devices 106, as well as other network nodes in the communication network 102. The interfaces 606, 610, 612, and 614 can be implemented in hardware to send and receive signals in a variety of mediums, such as optical, copper, and wireless, and in a number of different protocols some of which may be non-transient.

The cloud storage client device 106 can include user equipment (also referred to as mobile device, mobile terminal, etc.). The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The cloud storage client device 106 also includes any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. The client device 106 may be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The client device 106 can also provide a variety of user interfaces such as a keyboard, a touch screen, a trackball, a touch pad, and/or a mouse. The cloud storage client device 106 may also include speakers and a display device in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, systems and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method, comprising:
   detecting a change to content of a first file stored on a device connected to a cloud storage server, the first file having a first name;
   determining an operation load of a process associated with the change to the content of the first file based on a number of operations performed by the process;
   monitoring the process for a plurality of operations;
   determining that a first operation from the plurality of operations renames the first file from the first name of the first file to a second name of the first file;
   in response to determining that the first operation renames the first file, adding to an upload file list the second name of the first file;
   determining that a second operation from the plurality of operations creates or modifies a second file;
   in response to determining that the second operation creates or modifies the second file, adding to the upload file list a first name of the second file;
   determining that a third operation from the plurality of operations renames the second file from the first name of the second file to a second name of the second file;
   in response to determining that the third operation renames the second file:
      adding to the upload file list the second name of the second file; and
      removing from the upload file list the first name of the second file;
   determining that a fourth operation from the plurality of operations deletes the first file; and
   in response to determining that the fourth operation deletes the first file, removing from the upload file list the second name of the first file such that the upload file list includes the second name of the second file and does not include either the second name of the first file or the first name of the second file; and
   uploading to the cloud storage server, after removing from the upload file list the second name of the first file, the second file based on the upload file list including the second name of the second file.

2. The method of claim 1, wherein the first file is stored in a directory on the device, and the directory is managed by a cloud storage service program configured to run a background process.

3. The method of claim 1, wherein the first file and the second file each includes at least one of a document file, an image file, an executable file, a graphics file, an animation file, an object file, a database file and a text file.

4. The method of claim 1, wherein the process is associated with a running instance of an application program.

5. The method of claim 1, wherein the second file includes the content of the first file and the change to the content of the first file.

6. The method of claim 5, wherein the second name of the second file corresponds to the first name of the first file such that the second file, when uploaded to the cloud storage server, replaces a copy of the first file stored on the cloud storage server.

7. The method of claim 6, wherein the first file is renamed before the second file is renamed.

8. The method of claim 7, wherein the first file is deleted after the second file is renamed.

9. The method of claim 1, wherein the upload file list includes at least one of a queue, a linked list and a text file.

10. An apparatus, comprising:
    one or more interfaces configured to provide communication with one or more devices over a network; and
    a processor, in communication with the one or more interfaces, configured to run a cloud storage management module stored in memory that is configured to:
       detect a change to content of a first file stored on a device connected to a cloud storage server, the first file having a first name;
       determine a first operation load of a process associated with the change to the content of the first file using a load-measuring heuristic that calculates the first operation load of the process based on (1) a number of operations performed by the process at a first time, (2) a second operation load of the process associated with a second time and being non-zero, and (3) a multiplier applied to the second operation load of the process;
       in response to the first operation load of the process indicating that the process is busy:
          monitor a plurality of operations associated with the process;

determine that a first operation from the plurality of operations renames the first file from the first name of the first file to a second name of the first file;

in response to determining that the first operation renames the first file, add to an upload file list the second name of the first file;

determine that a second operation from the plurality of operations creates or modifies a second file;

in response to determining that the second operation creates or modifies the second file, add to the upload file list a first name of the second file;

determine that a third operation from the plurality of operations renames the second file from the first name of the second file to a second name of the second file;

in response to determining that the third operation renames the second file:
add to the upload file list the second name of the second file; and
remove from the upload file list the first name of the second file;

determine that a fourth operation from the plurality of operations deletes the first file; and in response to determining that the fourth operation deletes the first file, remove from the upload file list the second name of the first file; and in response to the first operation load of the process not indicating that the process is busy, upload to the cloud storage server the second file based on the upload file list including the second name of the second file.

11. The apparatus of claim 10, wherein the second file includes the content of the first file and the change to the content of the first file.

12. The apparatus of claim 11, wherein the second name of the second file corresponds to the first name of the first file such that the second file, when uploaded to the cloud storage server, replaces a copy of the first file stored on the cloud storage server.

13. The apparatus of claim 12, wherein the first file is renamed before the second file is renamed.

14. The apparatus of claim 13, wherein the first file is deleted after the second file is renamed.

15. The apparatus of claim 10, wherein the load-measuring heuristic calculates the first operation load of the process associated with the first time using an equation $L_t = F_t + H*L_{t-1}$, where
$L_t$ is the first operation load of the process,
$F_t$ is the number of operations performed by the process at the first time,
H is the multiplier, and
$L_{t-1}$ is the second operation load of the process associated with the second time.

16. A non-transitory computer readable medium having executable instructions operable to cause an apparatus to:
detect a change to content of a first file stored on a device connected to a cloud storage server, the first file having a first name;
monitor a plurality of operations associated with a process associated with the change to the content of the first file;
determine that a first operation from the plurality of operations renames the first file from the first name of the first file to a second name of the first file;
in response to determining that the first operation renames the first file, add to an upload file list the second name of the first file, the upload file list including one or more names of files and not information indicating one or more operations performed to files;
determine that a second operation from the plurality of operations creates or modifies a second file;
in response to determining that the second operation creates or modifies the second file, add to the upload file list a first name of the second file;
determine that a third operation from the plurality of operations renames the second file from the first name of the second file to a second name of the second file;
in response to determining that the third operation renames the second file:
add to the upload file list the second name of the second file; and
remove from the upload file list the first name of the second file;
determine that a fourth operation from the plurality of operations deletes the first file;
in response to determining that the fourth operation deletes the first file, remove from the upload file list the second name of the first file; and
upload to the cloud storage server the second file based on the upload file list including the second name of the second file.

17. The computer readable medium of claim 16, wherein the second file includes the content of the first file and the change to the content of the first file.

18. The computer readable medium of claim 17, wherein the second name of the second file corresponds to the first name of the first file such that the second file, when uploaded to the cloud storage server, replaces a copy of the first file stored on the cloud storage server.

19. The computer readable medium of claim 18, wherein the first file is deleted after the second file is renamed.

20. The computer readable medium of claim 18, wherein the uploading occurs after the second name of the second file remains on the upload file list for a predetermined period of time.

* * * * *